United States Patent
Pan et al.

(10) Patent No.: US 10,284,018 B2
(45) Date of Patent: May 7, 2019

(54) SYSTEM, APPARATUS AND METHOD FOR ADAPTIVE TUNING FOR WIRELESS POWER TRANSFER

(71) Applicant: Shenzhen Yichong Wireless Power Technology Co. Ltd., Shenzhen, GuangDong (CN)

(72) Inventors: Siming Pan, San Jose, CA (US); Dawei He, Burlingame, CA (US); Tun Li, San Jose, CA (US)

(73) Assignee: SHENZHEN YICHONG WIRLESS POWER TECHNOLOGY CO. LTD, Shenzhen, Guangdon (CN)

( * ) Notice: Subject to any disclaimer, the term of this patent is extended or adjusted under 35 U.S.C. 154(b) by 305 days.

(21) Appl. No.: 15/339,705

(22) Filed: Oct. 31, 2016

(65) Prior Publication Data

US 2017/0126049 A1     May 4, 2017

Related U.S. Application Data

(60) Provisional application No. 62/248,606, filed on Oct. 30, 2015.

(51) Int. Cl.
*H02J 50/12*     (2016.01)
*H02J 7/02*      (2016.01)
*H02J 7/04*      (2006.01)
*H02J 7/34*      (2006.01)

(52) U.S. Cl.
CPC ............ *H02J 50/12* (2016.02); *H02J 7/025* (2013.01); *H02J 7/045* (2013.01); *H02J 7/345* (2013.01)

(58) Field of Classification Search
CPC .. H02J 7/025; H02J 50/12; H02J 7/045; H02J 7/345
See application file for complete search history.

(56) References Cited

U.S. PATENT DOCUMENTS

| | | | |
|---|---|---|---|
| 2012/0200169 A1* | 8/2012 | Urano | H02J 5/005 307/104 |
| 2015/0035376 A1* | 2/2015 | Baarman | H02J 5/005 307/104 |

OTHER PUBLICATIONS

Amos, S. W., R. S. Amos, and G. W. A. Dummer. "Newnes Dictionary of Electronics 4, 1999." Reed Educational and Professional Publishing Ltd.; pp. 227, 229. (Year: 1999).*

* cited by examiner

*Primary Examiner* — Daniel J Cavallari
(74) *Attorney, Agent, or Firm* — Loza & Loza, LLP; Peter Zura

(57) ABSTRACT

Systems, apparatuses and methods for an adaptable tuning circuit for a wireless power transfer system including an inductor and a capacitor. An input may be configured to receive alternate current (AC) power. An RC circuit may include a resistor and a supply capacitor, where a first diode is configured to be forward biased when the AC power is positive for charging the supply capacitor, and a second diode is configured to be forward biased when the AC power is negative for minimizing discharge from the supply capacitor. A tuning logic is provided for controlling power from the supply capacitor to a tuning circuit comprising a tuning capacitor and a switch arrangement, wherein the tuning circuit is configured to be parallel to the capacitor of the wireless power transfer system.

20 Claims, 5 Drawing Sheets

SYSTEM, APPARATUS AND METHOD FOR ADAPTIVE TUNING FOR WIRELESS POWER TRANSFER

RELATED APPLICATIONS

The present application claims priority to U.S. Provisional Patent App. No. 62/248,606, to Jun Fan, titled "System, Apparatus and Method for Adaptive Tuning for Wireless Power Transmission" filed on Oct. 30, 2015, the contents of which is incorporated by reference in its entirety herein.

FIELD OF THE DISCLOSURE

The present disclosure relates to optimizing wireless charging. More specifically, the present disclosure relates to adaptive tuning for wireless power transfer (WPT) systems, and adaptive tuning configurations that do not require power transformers for the power transmitter circuit.

BACKGROUND

Wireless power transfer (WPT) or wireless energy transmission is the transmission of electrical power from a power source to a receiving device without using solid wires or conductors. Generally, the term refers to a number of different power transmission technologies that use time-varying electromagnetic fields. In wireless power transfer, a transmitter device is connected to a power source, such as the mains power line, and transmits power by electromagnetic fields across an intervening space to one or more receiver devices, where it is converted back to electric power and utilized. Wireless power transfer techniques may fall into two categories, non-radiative and radiative.

In near-field or non-radiative techniques, power may be transferred over short distances by magnetic fields using inductive coupling between coils of wire or by electric fields using capacitive coupling between electrodes, for example. Using these techniques, it may be possible to transfer power wirelessly within two meters distance with an efficiency of 70% at a frequency of 100 kHz. Applications of this type include, but are not limited to, cell phones, tablets, laptops, electric toothbrush chargers, RFID tags, smartcards, and chargers for implantable medical devices like artificial cardiac pacemakers, and inductive powering or charging of electric vehicles like cars, trains or buses. In radiative or far-field techniques, sometimes called "power beaming", power may be transmitted by beams of electromagnetic radiation, like microwave or laser beams. These techniques can transport energy longer distances but are typically aimed at the receiver.

Numerous standardized technologies have been developed over the years, including, but not limited to, Alliance for Wireless Power ("A4WP") which is based on an interface standard ("Rezence") for wireless electrical power transfer based on the principles of magnetic resonance, where a single power transmitter unit (PTU) is capable of charging one or more power receiver units (PRUs). The interface standard supports power transfer up to 50 Watts, at distances up to five centimeters. The power transmission frequency may be 6.78 MHz, and up to eight devices can be powered from a single PTU depending on transmitter and receiver geometry and power levels. A Bluetooth Smart link may be provided in an A4WP system for controlling power levels, identification of valid loads, and protection of non-compliant devices.

Another standardized WPT technology includes "Qi" which relies on electromagnetic induction between planar coils. A Qi system may include a base station, which is connected to a power source and provides inductive power, and a device that consumes inductive power. The base station may include a power transmitter having a transmitting coil that generates an oscillating magnetic field; the device may include a power receiver holding a receiving coil. The magnetic field from the transmitter may induce an alternating current in the receiving coil by Faraday's law of induction. A further standardized WPT technology includes "Powermat" adopted by the Power Matters Alliance (PMA), which is based upon inductively coupled power transfer, where a transmitter may vary current in a primary induction coil to generate an alternating magnetic field from within a charging spot. The receiver in the consuming device may have its own induction coil that takes power from the magnetic field and converts it back into electrical current to charge the device battery. An additional part of the technology is the use of system control communication via Data over Coil (DoC), where the receiver may send feedback to the transmitter by changing the load seen by the transmitter coil. The protocol is frequency based signaling, thus enabling fast response of the transmitter.

WPT systems often require adaptive tuning in order to modify resonance for a transmitter and/or receiver. Using adaptive tuning, the impedance of transmitter and/or receiver circuits may be modified to match one another (impedance matching). However, impedance matching often involves using a DC bias from an isolated switching mode power supply (SMPS) that includes a power transformer, which adds more size, weight and cost to the system and reduces design flexibility. Furthermore, SMPS-related electromagnetic interference (EMI) may cause issues in WPT circuitry and in some cases may lead to system failure. Accordingly, technologies are needed to provide efficient adaptive tuning without requiring the use of power transformers.

SUMMARY

Accordingly, under some illustrative embodiments, an adaptable tuning circuit is disclosed for a wireless power transfer system comprising an inductor and a transmitter capacitor, the circuit comprising: an input for receiving alternate current (AC) power; an RC circuit comprising a resistor and a supply capacitor; a first diode configured to be forward biased when the AC power is positive for charging the supply capacitor; a second diode configured to be forward biased when the AC power is negative for minimizing discharge from the supply capacitor; and a tuning logic for controlling power from the supply capacitor to a tuning circuit comprising a tuning capacitor and a switch arrangement, wherein the tuning circuit is configured as parallel to the transmitter capacitor of the wireless power transfer system.

In some illustrative embodiments, a method is disclosed for adaptably tuning a wireless power transfer system (WPTS) comprising an inductor and a transmitter capacitor, comprising providing an RC circuit coupled to an input of the WPTS, the RC circuit comprising a resistor and a supply capacitor; charging the supply capacitor by forward-biasing a first diode of the WPTS when an AC power signal received at the input is positive; minimizing discharge from the supply capacitor by forward-biasing a second diode when the AC power is negative; and controlling power from the supply capacitor to a tuning circuit, configured as parallel to the transmitter capacitor, via a tuning logic comprising a tuning capacitor and a switch arrangement.

In some illustrative embodiments, an adaptable tuning circuit is disclosed for a wireless power transfer system comprising an inductor and a transmitter capacitor, comprising an RC circuit comprising a resistor and a supply capacitor; a first diode configured to be forward biased when an alternate current (AC) power input is positive for charging the supply capacitor; a second diode configured to be forward biased when the AC power input is negative for minimizing discharge from the supply capacitor; a tuning circuit comprising a tuning capacitor and a switch arrangement, the tuning circuit being coupled in parallel to the transmitter capacitor; and a tuning logic for controlling power from the supply capacitor to the tuning circuit for adaptable tuning.

BRIEF DESCRIPTION OF THE FIGURES

The present disclosure will become more fully understood from the detailed description given herein below and the accompanying drawings which are given by way of illustration only, and which thus do not limit the present disclosure, and wherein.

DETAILED DESCRIPTION

Figure 1:
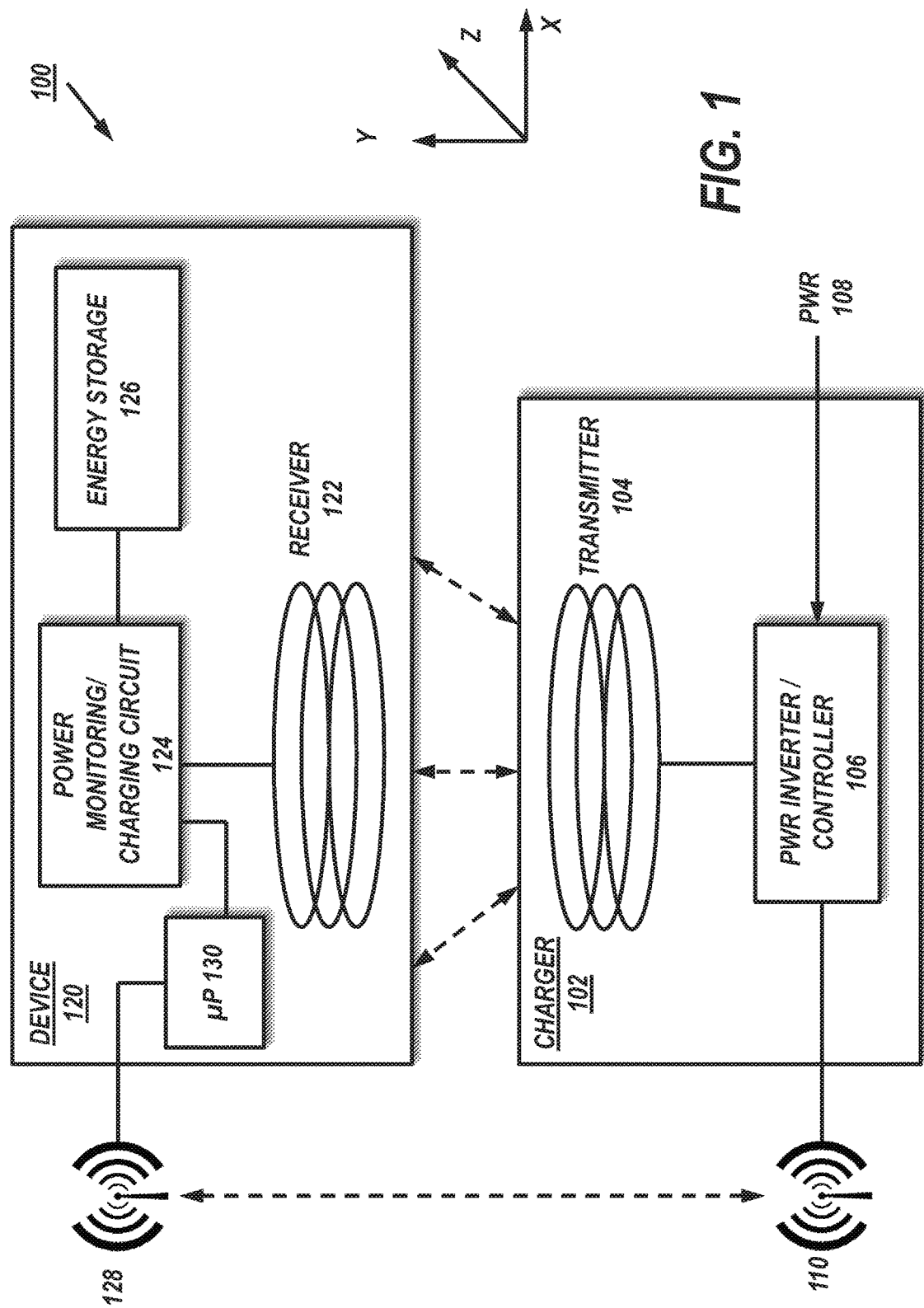
FIG. 1 shows a WPT system comprising a charger and a device configured to receive wireless power transfer under an illustrative embodiment.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Turning now to FIG. 1, a WPT system 100 is shown under an illustrative embodiment, including a charger 102 and a device 120 comprising an energy storage apparatus, such as battery 126. In one non-limiting example, device 120 may be an electronic device, such as a smart phone, table, laptop, medical device, power tool, and the like. In another non-limiting example, device 120 may be a car, bus, train, etc. It should be understood by those skilled in the art that device 120 may be any device capable of being configured to receive WPT signals to power device 120 and/or recharge an energy storage apparatus (e.g., 126).

In the example of FIG. 1, charger 102 may include a power inverter/controller 106 (hereafter "controller") that receives power from power source 108. Power source 108 may be mains power or any other suitable power source. Controller 106 may include, but is not limited to, power inverter circuitry, amplifier circuitry, oscillator circuitry, filter circuitry, impedance-matching circuitry, power control circuitry, processor circuitry, controllers and the like for generating and controlling power for transmission via transmitter 104 to receiver 122, which may be configured as coils, plates, magnetic armatures, and the like.

In some illustrative embodiments, transmitter 104 and receiver 122 may include a single coil configured to provide magnetic resonance and/or magnetic induction charging. In some illustrative embodiments, transmission coil 104 and receiver 122 may include a plurality of coils that may be configured in an overlapping and/or non-overlapping arrangement to provide magnetic resonance or magnetic induction charging. In some illustrative embodiments, transmitter 104 and receiver 122 may include electrodes, such as a plates, configured to transmit and couple power via electric induction. In some illustrative embodiments transmitter 104 and receiver 122 may transmit and couple power using magnetodynamic coupling using rotating armatures, which rotate synchronously, coupled together by a magnetic field generated by magnets on the armatures.

In some illustrative embodiments, controller 106 may include communications circuitry to allow controller 106 to communicate in a wired or wireless manner (e.g., WiFi, Bluetooth, infrared, etc.) with device 120. Communications circuitry of controller 106 may include a wireless antenna 110 for communicating data with wireless antenna 128 of device 120. Communicated data may include device-specific information and power feedback data from device 120, where the power feedback data may include data relating to power transfer efficiency, link efficiency, quality factor(s), and the like. Power feedback data may be alternatively provided through an RF power transfer link using a sub-carrier communication band suitable for packet-based communication using the transmitter 104 and receiver 122 pair directly.

In some illustrative embodiments, device 120 may include power monitoring and charging circuitry 124 that may be coupled to a processor 130 and energy storage 126, which may operate as a load in some illustrative embodiments. Power monitoring and charging circuitry 124 may include, but is not limited to, RF circuitry, rectifier circuitry, impedance matching circuitry, which may be configured to form an impedance matching network with controller 106, filter circuitry, communication circuitry for communicating via wireless antenna 128 and charging circuitry for providing power to energy storage 126. Power monitoring and charging circuitry 124 may also be coupled to processor 130 that may be configured to store and execute algorithms for measuring and/or calculating characteristics of the power being received (e.g., power transfer efficiency, link efficiency, quality factor(s), etc.) and provide it as feedback via wireless antenna 128 or other suitable means.

In an illustrative embodiment, device 120 may be placed within proximity of charger 102 in order to receive WPT signals in receiver 122, which is processed/converted in power monitoring and charging circuit 124 and provided to energy storage 126 for subsequent use. While not explicitly shown in FIG. 1, energy storage 126 may be coupled to other electronics within device 120 in one embodiment to provide operative power. During transfer of WPT, it may be advantageous that the transmitter 104 and receiver 122 be physically aligned along the x, y, and/or z axis to ensure that excessive signal loss is not introduced as a result of misalignment in any of the axes, which in turn may materially affect power signal transfer and efficiency.

Figure 1A:
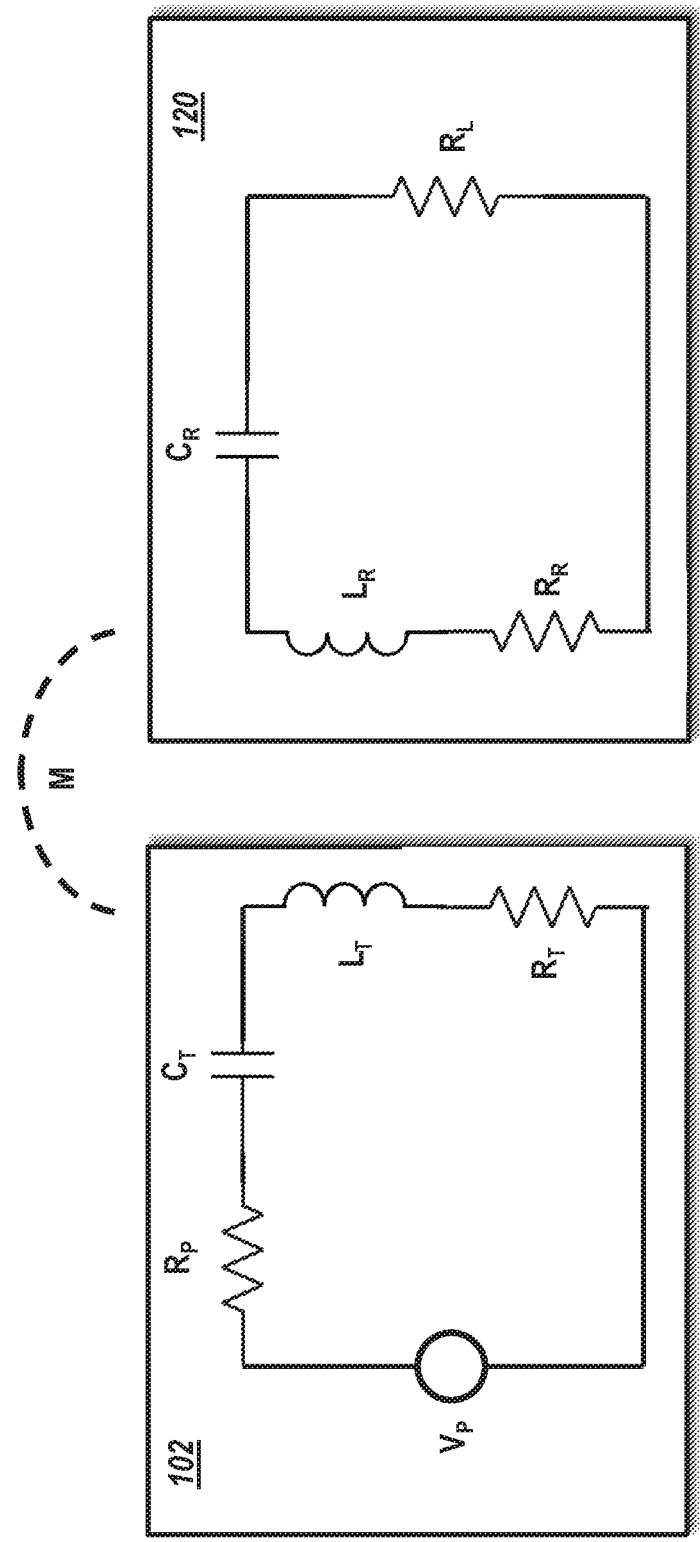
FIG. 1A shows an equivalent circuit of the WPT circuit portions of the system of FIG. 1 under an illustrative embodiment.

Turning to FIG. 1A, an equivalent circuit is shown using portions of the WPT system 100 of FIG. 1, where, in this non-limiting example, the transmitter 104 and receiver 122 are configured as resonating WPT circuits. Transmitter 102 may include a voltage source with amplitude $V_P$ at frequency $\omega$ and having power source resistance $R_P$. The voltage source may be coupled to a transmitter resonator circuit that may include capacitor $C_T$, inductor $L_T$ and resistor $R_T$. Energy may oscillate at a resonant frequency between inductor $L_T$ (representing energy stored in the magnetic field) and capacitor $C_T$ (representing energy stored in the electric field) and may be dissipated in resistor $R_T$. The resonator circuit of transmitter 102 may be coupled through mutual inductance (M) to inductor $L_R$ of receiver 120, which may similarly resonate using circuit $C_R$ and $R_R$ to provide power to load $R_L$.

Generally speaking, a resonator (e.g., 104, 122) may be described by multiple parameters, including, but not limited to, its resonant frequency $\omega$ and its intrinsic loss rate $\Gamma$. The ratio of these parameters may be used to determine a quality factor, or Q of the resonator, where $Q=\omega/2\Gamma$ to measure how well a resonator stores energy. The resonant frequency and quality factor for the transmitter and receiver (T, R) resonators may be expressed as $$\omega_{(T,R)} = \frac{1}{\sqrt{L_{(T,R)}C_{(T,R)}}}, \text{ and}$$

$$Q = \frac{\omega_{(T,R)}}{2\Gamma} = \sqrt{\frac{L_{(T,R)}}{C_{(T,R)}}}\frac{1}{R_{(T,R)}} = \frac{\omega_{(T,R)}L_{(T,R)}}{R_{(T,R)}}$$

From FIG. 1A, the transmitter (e.g., 104) and receiver (e.g., 122) coils may be represented by inductors $L_T$ and $L_R$, respectively, that may be coupled through mutual inductance M, where $M=k\sqrt{L_T L_R}$, where k is a coupling coefficient or energy coupling rate. Each coil may have a series capacitor ($C_T$, $C_R$) to form a resonator. Resistances $R_T$ and $R_R$ may be considered parasitic resistances that include all ohmic, dielectric, and radiative losses of the respective coil and resonant capacitor. The load, which may be energy storage 126 is represented in this example by $R_L$.

Power delivered to the load (e.g., $R_L$) may be determined by dividing the maximum power available from the transmitter when both the transmitter and receiver are resonant at $\omega$, or $$\frac{P}{P_{T,max}} = \frac{4 \cdot U^2 \frac{R_P}{R_T}\frac{R_L}{R_R}}{\left(\left(1+\frac{R_P}{R_T}\right)\left(1+\frac{R_L}{R_R}\right)+U^2\right)^2}$$

where U may be considered the performance metric ("figure of merit") for the system and may be expressed as $$U = \frac{\omega M}{\sqrt{R_T R_R}} = \frac{k}{\sqrt{\Gamma_T \Gamma_R}} = k\sqrt{Q_T Q_R}.$$

Impedance matching (e.g., using an impedance transformation network) may be used to match resistances as closely as practicable to improve initial efficiency (e.g., $R_T/R_R = \sqrt{1+U^2}$), where the efficiency of the power transfer may be maximized according to $$\eta_{opt} = \frac{U^2}{\left(1+\sqrt{1+U^2}\right)^2}$$

where higher-efficiency energy transfer may be achieved with higher values of U. Efficiency may also be based on energy loss rates within a receiver ($\Gamma_R$), and/or may be based on a magnetic coupling coefficient (k) between the resonators and the resonator quality factors for the transmitter and receiver ($Q_T$, $Q_R$) as follows:

$$U = \frac{\omega M}{\sqrt{R_T R_R}} = k\sqrt{Q_T Q_R}$$

By using the resonator quality factors and the range of metric coupling between the transmitter and receiver for a specific application, the efficiency of a WPT could readily be determined.

Figure 2:
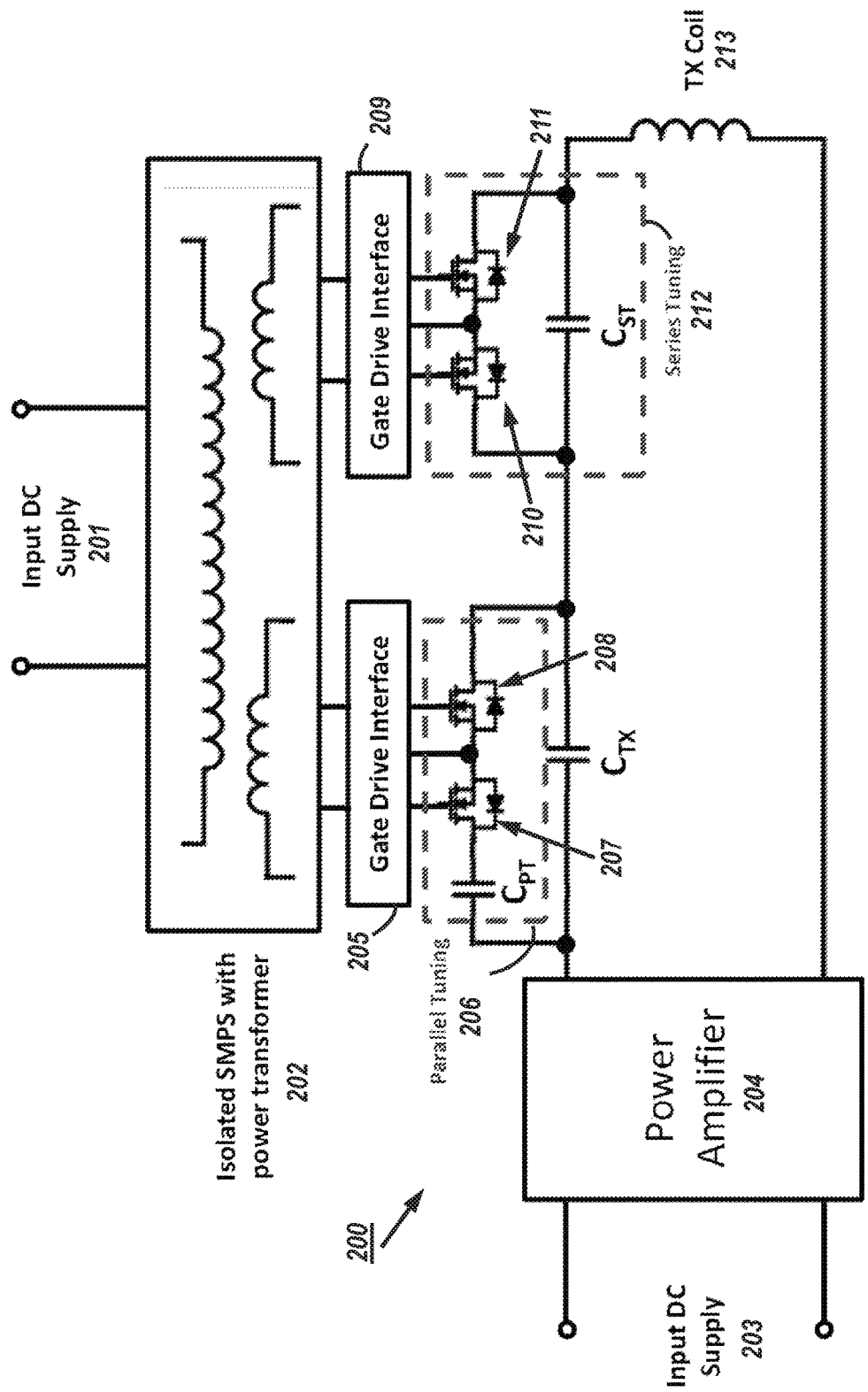
FIG. 2 shows a WPT system utilizing adaptive tuning, wherein the WPT system includes a transmitting coil powered by an input DC power supply, and further includes an isolated SMPS and power transformer that provides power through a plurality of gate drive interfaces to drive a parallel tuning circuit and a series tuning circuit.

Turning to FIG. 2, an adaptive tuning configuration 200 for a transmitter (TX) circuit is provided, where an input DC power supply 203 is provided to a power amplifier 204 that provides power to transmitter coil 213. As can be seen in the figure, adaptive tuning circuits are provided to change the resonant capacitance of the TX coil adaptively and thereby change its resonant frequency. Similar adaptive tuning circuits can also be used to change the resonant capacitance of the RX coil. Impedance matching, which is not illustrated in FIG. 2, may generally be performed by inserting a matching network (such as an LC circuit), between power amplifier 204 and the TX resonator circuit, to minimize a power reflection ratio to the power source of the system. As an example, for given working frequency (e.g., 6.78 MHz), impedance matching may effectively change the impedance of the TX resonant tank and therefore may improve the overall system efficiency or increase the total output power capability. Impedance matching may also be performed in the RX side.

As shown in FIG. 2, an input DC supply 201 provides power to an isolated SMPS that includes a power transformer 202, which are configured to power gate drive interfaces 205 and 209. Gate drive interface 205 is coupled to parallel tuning circuit 206, which utilizes switches 207 and 208 to control connectivity between the transmitter capacitive element $C_{TX}$ and parallel tuning capacitor $C_{PT}$. In the example, switches 207 and 208 are shown as n-channel metal-oxide-semiconductor field-effect transistors (MOSFETS), although those skilled in the art will appreciate that other types of switches may be used as well. In use, gate drive interface 205 may provide signals to the gate terminals of switches 207 and 208 as well as a common signal to each source terminal of each respective switch. Using the configuration shown, gate driver interface 205 causes switches 207 and/or 208 to switch on and off to create parallel capacitance connections between $C_{TX}$ and $C_{PT}$ (parallel tuning), which in turn increases the resonant capacitance.

In the series tuning circuit 212 of FIG. 2, the gate drive interface 209 may provide signals to the gate terminals of switches 210 and 211 as well as a common signal to each source terminal of each respective switch. Using the configuration shown, gate driver interface 209 causes switches 210 and/or 211 to switch on and off to create series capacitance connections between $C_{TX}$ and $C_{ST}$ (series tuning), which in turn decreases the resonant capacitance. As before, switches 210 and 211 are shown as n-channel MOSFETS, although those skilled in the art will appreciate that other types of switches may be used as well. Since the tuning switches (e.g., 207-208, 210-211) rely on the DC bias supply generated from the SMPS with the power transformer, unneeded size, weight and cost is added to the system and design flexibility may be reduced. Furthermore, SMPS related EMI effects may cause additional issues with the circuitry and in certain cases may even cause system design failure.

Figure 3:
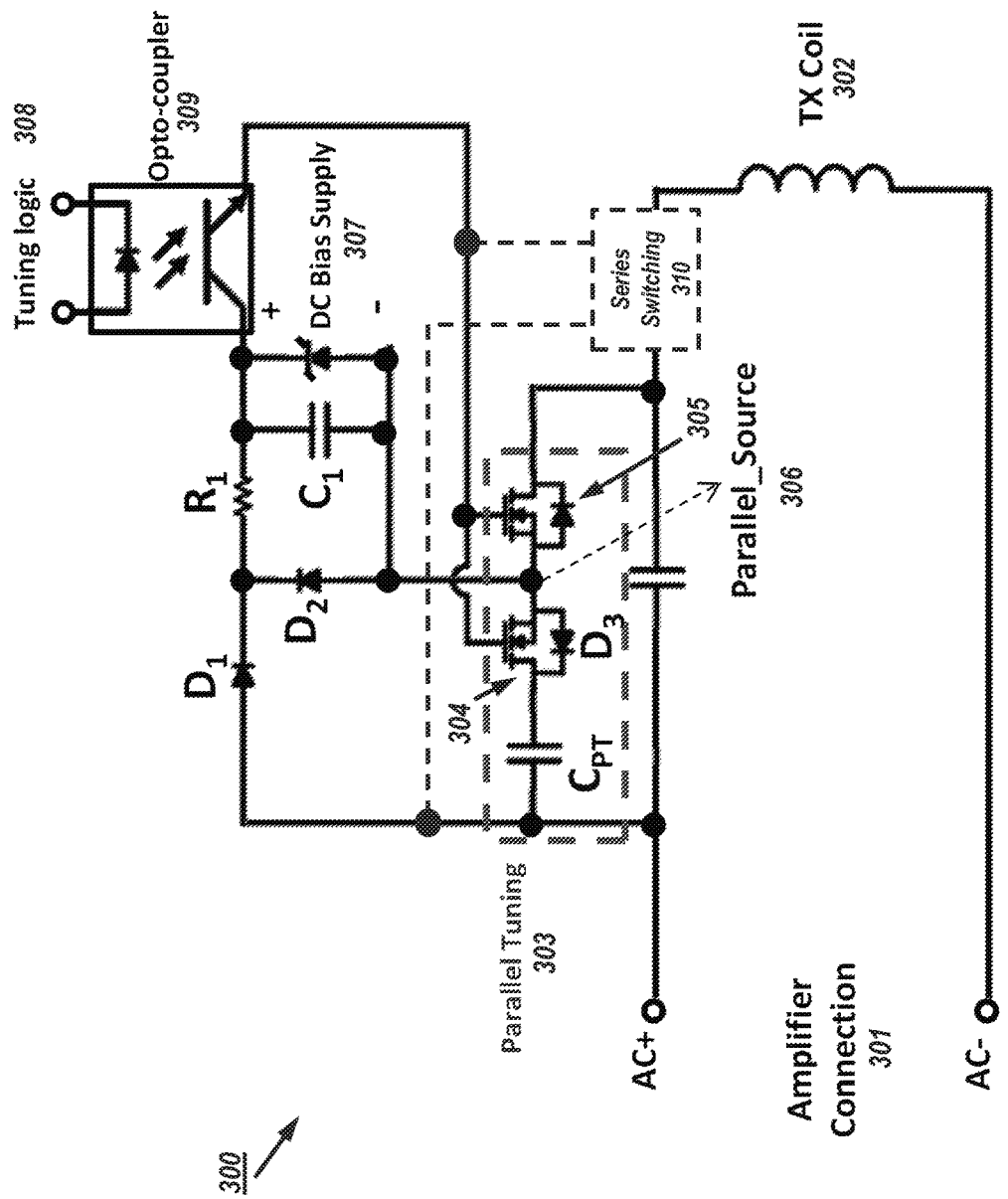
FIG. 3 shows a transformerless adaptive tuning circuit for a transmitter utilizing AC energy, where a parallel tuning circuit coupled to a tuning logic that may control operation of the parallel tuning circuit using a DC bias supply under an illustrative embodiment.

Turning to FIG. 3, a transformerless adaptive tuning circuit 300 for a transmitter is shown under an illustrative embodiment. Instead of using a SMPS, the adaptive tuning circuit 300 utilizes AC energy from the resonant tank via amplifier connection 301 to generate DC bias supply. In this example, voltage from the positive terminal (AC+) of amplifier connection 301 passes through diode D1 to RC circuit R1, C1 that provide a DC bias voltage/supply 307 across the zener diode as shown. The DC bias supply's input may be configured as the resonant voltage across the parallel tuning capacitor $C_{PT}$, and the AC voltage source between AC+ and the Parallel_Source 306, where AC+ may be configured as a positive input of the impedance matching network and the Parallel_Source is configured as a common source of the switch pair 305, 306 used in parallel tuning circuit 303.

In use, when the AC input for the tuning circuit 300 is positive (AC+), the positive voltage will forward bias the diode $D_1$ and charge the capacitor $C_1$ through resistor $R_1$. When the input is negative, the diode $D_2$ will be forward-biased if there is negative voltage across $R_1$ and $C_1$, and thus block the capacitor $C_1$ from discharging. Furthermore, the voltage on capacitor $C_1$ may be charged to an average value of the positive half of the AC voltage source. Accordingly, the energy held in $C_1$ may be utilized as a DC bias supply and may be supplied to the gate of the switch pair 304-305 to activate/deactivate the tuning switches (304-305). In an illustrative embodiment, the control for switches 304-305 may be realized using a tuning logic 308 that may include an opto-coupler 309 configured to transfer DC voltage to switches 304-305. The zener diode parallel with $C_1$ may be used to clamp the voltage on $C_1$ below some voltage threshold to prevent from damaging the tuning switches. In an alternate embodiment, a series switched tuning circuit 310 may also be included in addition to the parallel circuit 303 to provide even further control.

One advantage of the self-bias supply circuit of FIG. 3 is that it utilizes the AC energy of the resonant tank to generate the gate drive bias supply for the floating tuning switches (304-305). This innovative self-bias supply circuit simplifies the DC bias supply design for the gate drive scheme for switching and may be extended to multiple tuning switch pairs in a tunable matching network and make the solution reliable and cost-effective.

Figure 4:
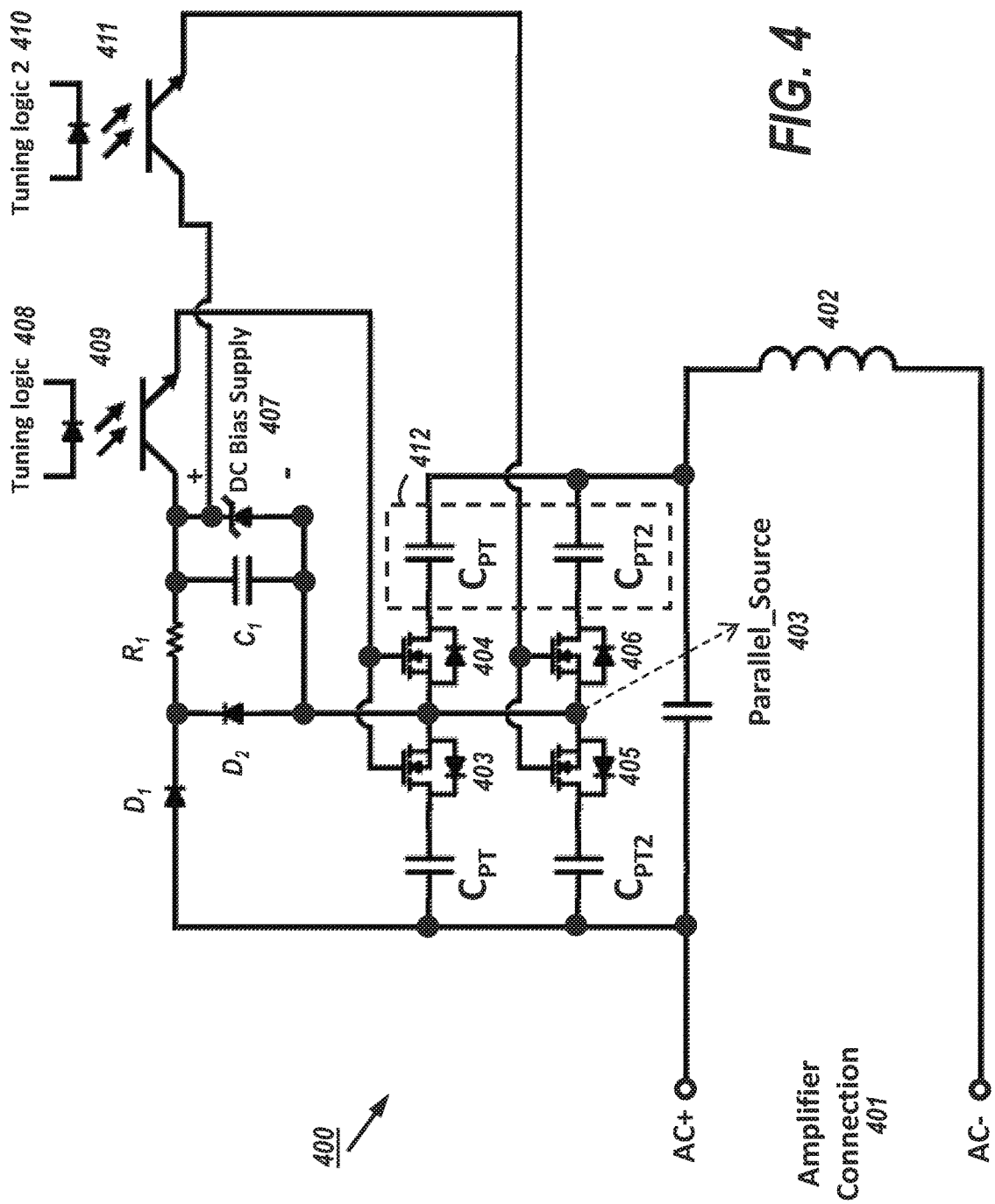
FIG. 4 shows a transformerless adaptive tuning circuit for a transmitter utilizing AC energy, where multiple parallel tuning circuits are coupled to respective tuning logics that may control operation of the parallel tuning circuits using a DC bias supply under an illustrative embodiment.

One such example of tuning switch pairs is shown in FIG. 4 under an illustrative embodiment, where two (2) sets of parallel tuning capacitors ($C_{PT}$, $C_{PT2}$) are shown. As discussed above in connection with FIG. 3, adaptive tuning circuit 400 utilizes AC energy from the resonant tank via amplifier connection 401 to generate DC bias supply. In this example, voltage from the positive terminal (AC+) of amplifier connection 401 passes through diode D1 to RC circuit R1, C1 that provide a DC bias voltage/supply 407 across the zener diode as shown. The DC bias supply's input may be configured as the resonant voltage across the parallel tuning capacitor $C_{PT}$ and $C_{PT2}$, and the AC voltage source between AC+ and the Parallel_Source 403, where AC+ may be configured as a positive input of the impedance matching network and the Parallel_Source is configured as a common source of the switch pair 403-404 and 404-405 used in parallel tuning circuit 400.

In use, when the AC input for the tuning circuit 400 is positive (AC+), the positive voltage may forward bias diode D1 as well as either or both of the diodes of switches 403-404 and 405-406, and charge the capacitor $C_1$ through resistor $R_1$. When the input is negative, the diode $D_2$ may be forward-biased if there is negative voltage across $R_1$ and $C_1$, and thus block the capacitor $C_1$ from discharging. Furthermore, the voltage on capacitor $C_1$ may be charged to an average value of the positive half of the AC voltage source. Accordingly, the energy held in $C_1$ may be utilized as a DC bias supply and may be supplied to the gate of the switch pairs 403-404 and 405-406 to activate/deactivate the tuning switches. In an illustrative embodiment, the control for switches 403-404 and 405-406 may each be realized using a tuning logic 408 that may include an opto-coupler 409 and series-coupled tuning logic 410 that may include an opto-coupler 411, each of which may be configured to respectively transfer DC voltage to switch pairs 403-404 and 405-406. As before, the zener diode parallel with $C_1$ may be used to clamp the voltage on $C_1$ below some voltage threshold to prevent from damaging the tuning switches. Additional parallel tuning capacitors 412 may be added as illustrated in FIG. 4 to provide more tuning capabilities. It can be further appreciated by those skilled in the art that the self-bias supply disclosed herein may be applied for both parallel tuning and series tuning switch pair.

As such, it should be appreciated that the present disclosure provides an innovative transformerless adaptive tuning circuit that may be used to improve the overall system efficiency or increase the total output power in wireless power transfer. By eliminating the usage of the isolated SMPS and its power transformer, footprint, weight and cost, numerous advantages may be realized, including, but not limited to, design flexibility. Additionally, EMI noise problems associated with SMPS configurations may be minimized or eliminated. The adaptive tuning circuits disclosed herein may be also extended to multiple tuning switch pairs in a tunable matching network and make the solution reliable and cost-effective.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. An adaptable tuning circuit for a wireless power transfer system comprising an inductor and a capacitor, comprising:
    an input for receiving alternate current (AC) power;
    an RC circuit comprising a resistor and a supply capacitor;
    a first diode configured to be forward biased when the AC power is positive for charging the supply capacitor;
    a second diode configured to be forward biased when the AC power is negative for minimizing discharge from the supply capacitor; and
    a tuning logic for controlling power from the supply capacitor to a tuning circuit comprising a tuning capacitor and a switch arrangement, wherein the tuning circuit is configured one of parallel or in series to the capacitor of the wireless power transfer system.

2. The adaptable tuning circuit of claim 1, further comprising a zener diode coupled in parallel to the supply capacitor, wherein the zener diode is configured to clamp the voltage of the supply capacitor below a threshold amount.

3. The adaptable tuning circuit of claim 1, wherein the first diode is coupled in series to the resistor.

4. The adaptable tuning circuit of claim 1, wherein the second diode is coupled in parallel to the supply capacitor.

5. The adaptable tuning circuit of claim 1, wherein the switch arrangement comprises a plurality of transistors.

6. The adaptable tuning circuit of claim 5, wherein each of the transistors comprise a MOSFET transistor.

7. The adaptable tuning circuit of claim 6, wherein each gate terminal of each MOSFET transistor is coupled to the tuning logic, and each source of each MOSFET transistor is coupled to the RC circuit.

8. The adaptable tuning circuit of claim 1, wherein the tuning logic comprises an opto-coupler.

9. A method for adaptably tuning a wireless power transfer system (WPTS) comprising an inductor and a capacitor, comprising:
    providing an RC circuit coupled to an input of the WPTS, the RC circuit comprising a resistor and a supply capacitor;
    charging the supply capacitor by forward-biasing a first diode of the WPTS when an AC power signal received at the input is positive;
    minimizing discharge from the supply capacitor by forward-biasing a second diode when the AC power is negative; and
    controlling power from the supply capacitor to a tuning circuit, configured as one of parallel or in series to the capacitor, via a tuning logic comprising a tuning capacitor and a switch arrangement.

10. The method of claim 9, further comprising:
    clamping the voltage of the supply capacitor below a threshold amount via a zener diode coupled in parallel to the supply capacitor.

11. The method of claim 9, wherein charging the supply capacitor by forward-biasing a first diode comprises coupling the first diode in series to the resistor.

12. The method of claim 9, wherein minimizing discharge from the supply capacitor by forward-biasing a second diode comprises coupling the second diode in parallel to the supply capacitor.

13. The method of claim 9, wherein the switch arrangement comprises a plurality of transistors.

14. The method of claim 13, wherein each of the transistors comprise a MOSFET transistor.

15. The method of claim 14, wherein each gate terminal of each MOSFET transistor is coupled to the tuning logic, and each source of each MOSFET transistor is coupled to the RC circuit.

16. The method of claim 9, wherein the tuning logic comprises an opto-coupler.

17. An adaptable tuning circuit for a wireless power transfer system comprising an inductor and a capacitor, comprising:
- a circuit for generating a stable DC voltage from alternate current (AC) power existing in the wireless power transfer system;
- one or more tuning circuits, each comprising a tuning capacitor and a switch arrangement, wherein the tuning circuit is configured to be coupled one of parallel or in series to the capacitor of the wireless power transfer system, and the switch arrangement is configured to turn on and off to tune the overall capacitance value;
- a protection circuit to limit the generated DC voltage to prevent damage to the tuning switches; and
- one or more tuning logic circuits configured to control the switch arrangement in the tuning circuits.

18. The adaptable tuning circuit of claim 17, wherein the one or more tuning logic circuits comprises one or more opto-couplers.

19. A method for adaptably tuning a wireless power transfer system (WPTS) comprising an inductor and a capacitor, comprising:
- generating a stable DC voltage from alternate current (AC) power existing in the wireless power transfer system;
- controlling the switches using the generated DC voltage to tune the overall capacitance value using tuning capacitors based on tuning logic; and
- limiting the generated DC voltage to prevent it from damaging the tuning switches.

20. The adaptable tuning circuit of claim 19, wherein the tuning circuit comprises an opto-coupler.

* * * * *